Sept. 3, 1957  J. G. LEE ET AL  2,805,031
SUPERSONIC FLIGHT CONTROL DEVICE
Filed April 23, 1949  4 Sheets-Sheet 3

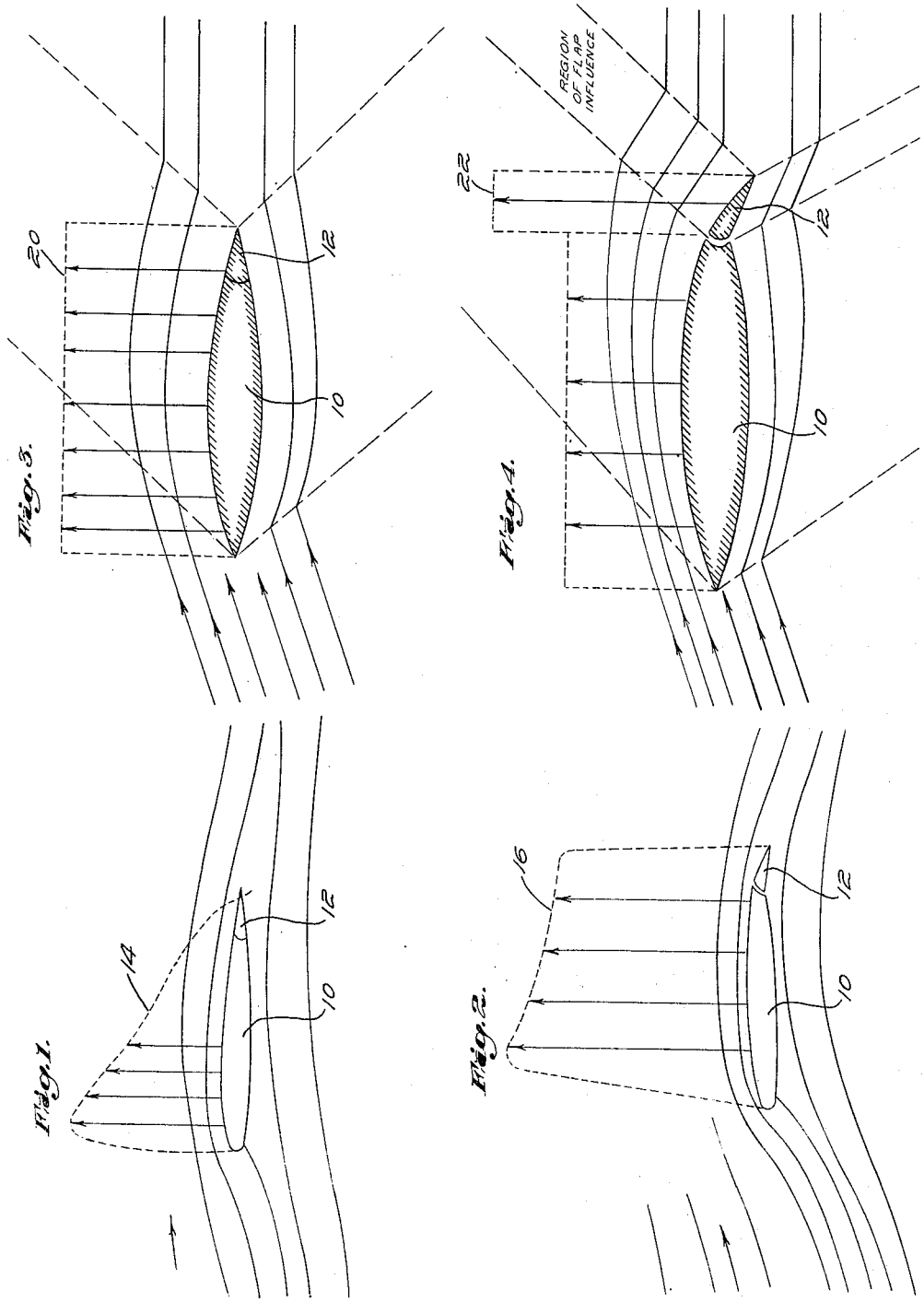

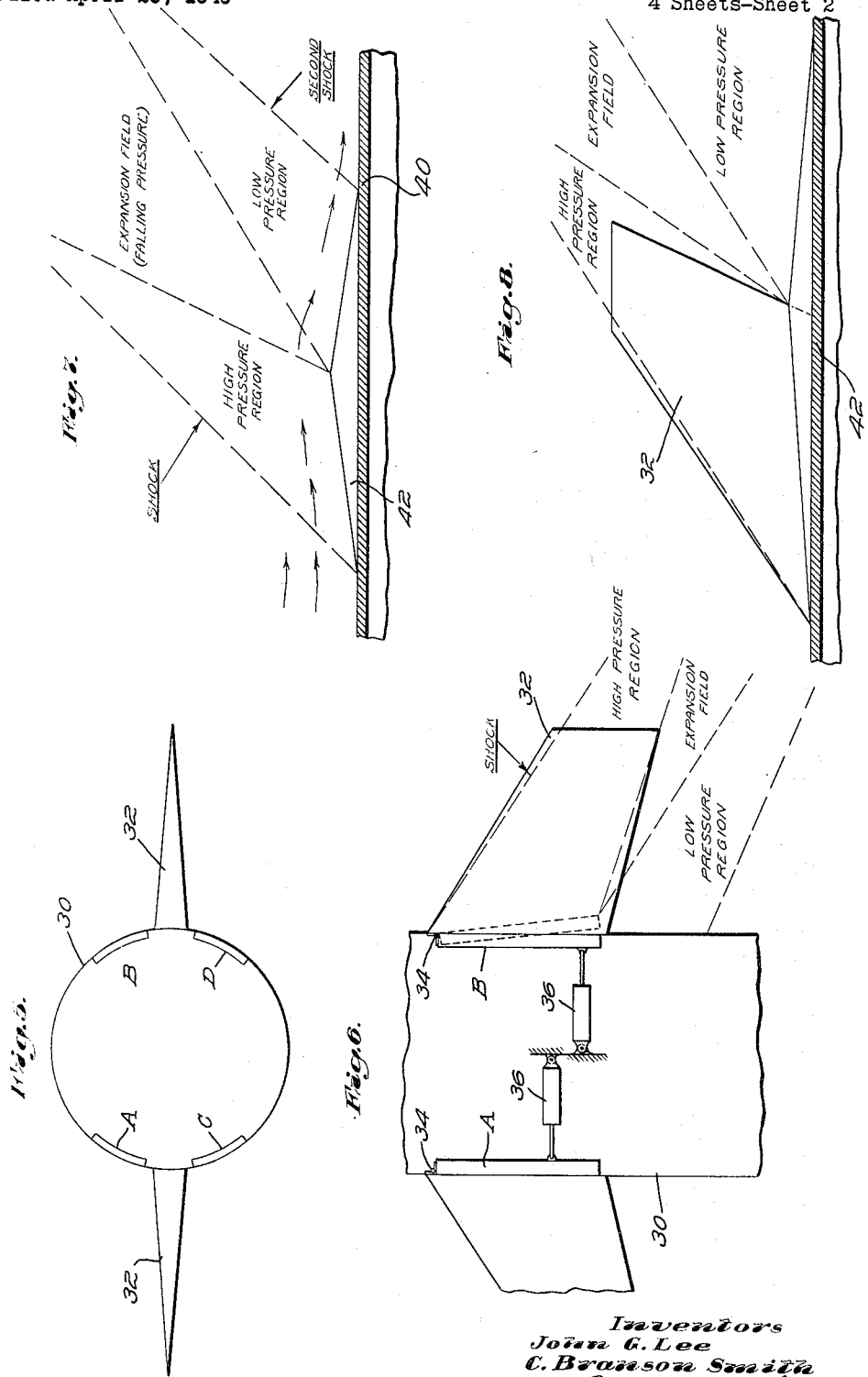

Inventors
John G. Lee
C. Branson Smith
by M. B. Tasker
Attorney

Sept. 3, 1957 J. G. LEE ET AL 2,805,031
SUPERSONIC FLIGHT CONTROL DEVICE
Filed April 23, 1949 4 Sheets-Sheet 4
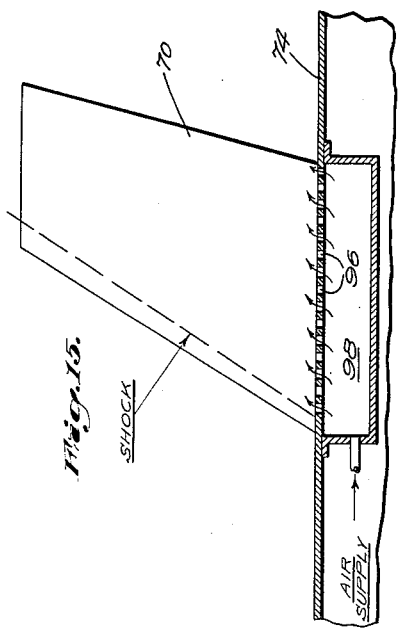
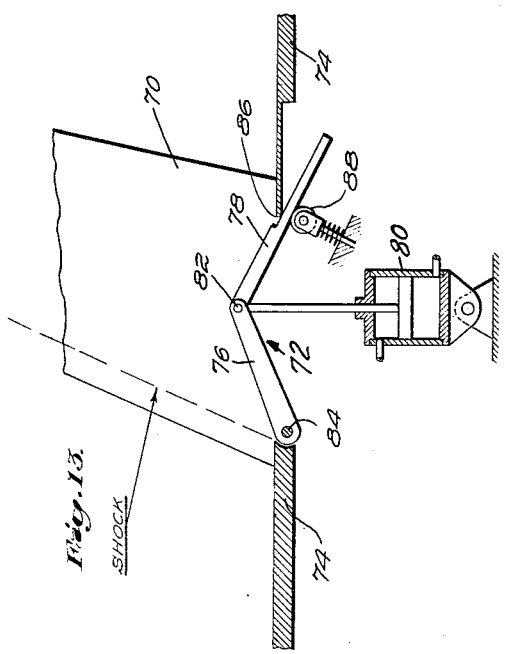
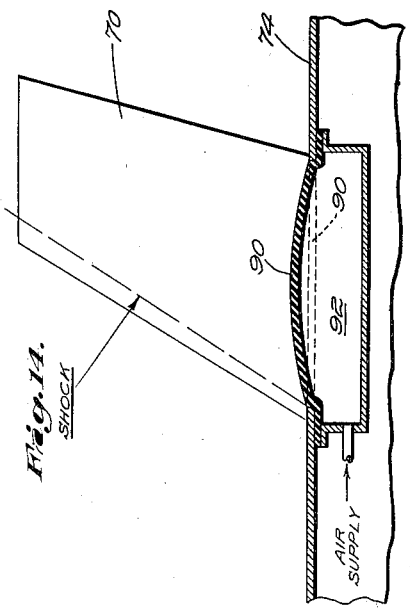
Inventors
John G. Lee
C. Branson Smith
by M. B. Tasker
Attorney United States Patent Office 2,805,031
Patented Sept. 3, 1957

2,805,031

SUPERSONIC FLIGHT CONTROL DEVICE

John G. Lee, Farmington, and Charles Branson Smith, Portland, Conn., assignors, by mesne assignments, to Chance Vought Aircraft, Incorporated, a corporation of Delaware Application April 23, 1949, Serial No. 89,306

7 Claims. (Cl. 244—42)

This invention relates to supersonic aircraft and more specifically to a control system for such vehicles.

With the advent of supersonic flight a number of problems have arisen in connection therewith which heretofore were unknown. Particularly important in this group of problems is that of controlling supersonic vehicles without becoming involved in high drags, heavy structures and intricate control mechanisms.

It is, therefore, an object of this invention to provide a control system for supersonic vehicles and aircraft whereby simple and small control members capable of providing relatively large control forces are utilized.

Another object of this invention is to provide a control system for aircraft adapted to fly at supersonic speeds wherein the usual problems arising from conventional flap type control surfaces are eliminated.

A further object of this invention is to provide a control system for supersonic aircraft wherein shock waves including high and low pressure regions are controllably produced and directed over surfaces fixed relative to the aircraft to provide directional, horizontal and lateral control of the aircraft.

A still further object of this invention is to provide a control system of the type described having relatively large control force producing characteristics while having low drag qualities.

These and other objects of this invention will become readily apparent from the following description of the drawings wherein like reference numerals refer to like parts throughout.

In these drawings,

Fig. 1 is a schematic view of an airfoil in subsonic flight indicating the forces acting thereon when its flap type control surface is in an undeflected position.

Fig. 2 is similar to Fig. 1 indicating the forces acting on the airfoil with its flap type control in a deflected position in subsonic flight.

Fig. 3 is a schematic view of an airfoil in supersonic flight and indicates the forces acting on the airfoil when its flap type control surface is undeflected.

Fig. 4 is similar to Fig. 3 indicating the forces on the supersonic airfoil when its flap type control surface is in a deflected position.

Fig. 5 is a front view of a supersonic aircraft having the control system of this invention.

Fig. 6 is a partial top view of the aircraft shown in Fig. 5.

Fig. 7 is a schematic view of the air stream effects produced by the projectable control members of this invention.

Fig. 8 is a schematic view indicating a means for utilizing the high pressure region produced by the projectable control members to provide control of the aircraft.

Fig. 13 is a partial cross sectional view of the fuselage indicating a modified type of extensible shock producing member.

Fig. 14 is similar to Fig. 13 indicating a diaphragm type extensible shock producing member.

Fig. 15 is similar to Fig. 13 indicating an air jet type shock producing arrangement.

Figure 11:
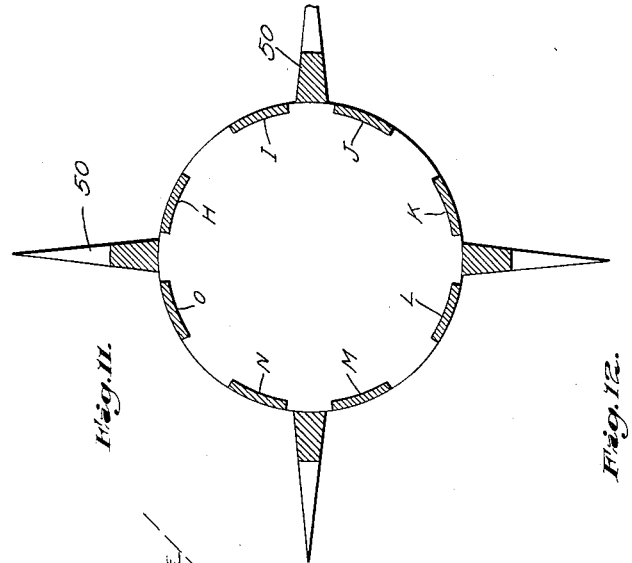
Fig. 11 is a cross sectional view of Fig. 10 looking aft from a position just forward of the tail surfaces.

In order to best understand the principles involved in this invention it is best to refer to Fig. 1 wherein an airfoil 10 is shown in subsonic flight. When the flap type control 12 is in an undeflected position the lift forces produced on the airfoil will assume values as indicated by the dotted line 14. When the flap type control 12 is deflected as shown in Fig. 2 the lift forces on the airfoil 10 will vary considerably over the entire surface as indicated by the dotted line 16. This effect of deflecting a flap type control surface in subsonic airflow is well known and theoretically the effect of the flap on the airflow takes place not only over the entire airfoil surface but extends forward thereof to infinity.

The above airflow characteristics do not, however, hold true for airfoils in supersonic flow but instead the lift forces will assume the values indicated by the dotted line 20 as shown in Fig. 3 when the flap type control 12 is in an undeflected position. Initially it can be seen that the lift forces produced on the airfoil 10 in supersonic flight are substantially constant throughout the chordwise dimension of the airfoil. Due to the high speed of the airflow over the airfoil when the flap 12 is deflected as shown in Fig. 4 it will affect the flow of fluid only in the vicinity of the control surface so that the lift forces will assume values as indicated by the dotted line 22. It is then apparent that even though the high speed of air flowing over the flap 12 will produce high lift forces for a small deflection of the flap, the forces produced thereby result in a control influence over a relatively small area; and, while in subsonic flight the airflow is disturbed over the entire main airfoil and well ahead of the airfoil, in supersonic flight the region of flap influence can be considered as taking effect over an area similar to the shaded area shown in Fig. 4. It becomes evident, then, in referring to Fig. 4, that should it become necessary to deflect the control flap 12 downwardly to correct a disturbance the concentrated lift forces which act generally only over the flap type control surface may possibly twist or warp the main airfoil to the extent that the original disturbance which was being corrected may be further increased. This problem may be avoided by rotating the entire control surface around a spanwise axis. However, such a construction is difficult and restrictive in large missiles. Either type of control has severe structural limitations.

With the region of flap influence being so small in area when utilizing a flap type control surface it then becomes evident that some method must be devised wherein this region can be produced over the entire airfoil to obtain a controlling force substantially as effective as that obtained in subsonic flight. To this end the fuselage 30 (Fig. 5) of the supersonic aircraft is provided with fixed control surfaces 32 and a plurality of extensible members A, B, C and D which normally lie flush with the outer surface of the fuselage and can be moved outwardly therefrom to produce a shock wave over the fixed surface 32. The projectable members may take the form of flaps A and B as shown in Fig. 6 which are pivoted at 34 and can be moved outwardly into the air stream by pistons 36. Upon extension of the flap B, for example, a shock wave will be produced whereby a high pressure region will appear substantially over the entire control surface 32 tending to impart rotational movement to the fixed surface and the fuselage about the longitudinal axes of the aircraft. The simultaneous extension of the flaps A and B, for example, assuming that the fixed surfaces 32 are positioned in the tail portion of the aircraft will cause a downward movement of the tail of the aircraft and cause the nose to rise. Similarly, roll control can be effected by selectively extending the members A and D or B and C. Directional control of the aircraft may be obtained by deflecting, for example, the flaps A and D, and after a certain amount of roll has been produced, the flaps A and B may be brought into play to provide sufficient tuning control.

Prior to describing other modifications of this control system it might be well to explain in detail the pattern of the entire shock wave produced by the extensible control members by referring to Fig. 7 wherein the wall 40 of a fuselage is shown including a protruding control member 42 for producing the shock wave. The control member 42 is shown herein as being of delta profile for illustration purposes since the drag caused by such a member would be somewhat lower than the flap type members A and B shown in Figs. 5 and 6. Further, the extensible control members A and B may well take the shape of the protruding member 42 should it be desirable to utilize such a configuration as shown, for example, in Fig. 13. As is seen in Fig. 7 as the supersonic flow of air reaches the leading edge of the member 42 the air must be deflected so that it will run parallel to the forward sloping portion of the member 42. As a result a shock wave will be produced and will be followed by a high pressure region as shown. As the fluid moves adjacent the aft trailing slope of the member 42 it is again deflected parallel to the aft surface so that a low pressure region is encountered thereby creating a relatively V-shaped expansion field between the high and low pressure regions. Finally, as the airflow again is deflected so as to become parallel with the fuselage in the area aft of the member 42, a second shock is further experienced which, for purposes of this description, we are not concerned. In utilizing a shock producing control system of this type comparatively small drag is produced during operation thereby contributing greatly to the overall efficiency of the device.

Figure 9:
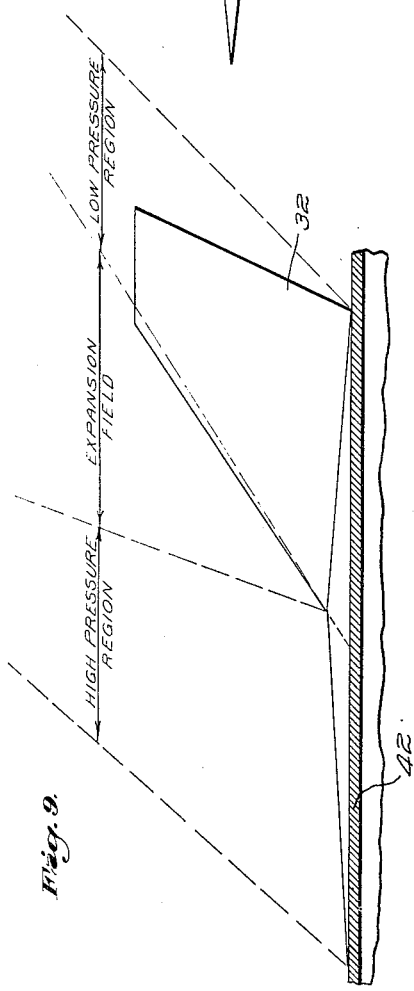
Fig. 9 is similar to Fig. 8 but indicates a method of utilizing a low pressure region to control the aircraft.

From the above description it then becomes evident by referring to Figs. 8 and 9 that either the high pressure region or the low pressure region resulting from the shock may be utilized to produce a controlling force on the fixed surface 32 by locating the extensible member 42 in a forward or aft position relative thereto. Further, should it be desirable to greatly increase the total control force on the fixed surface 32 it may be desirable to produce a high pressure region on one face of the control surface 32 and a low pressure on the other face of the control surface 32.

Figure 10:
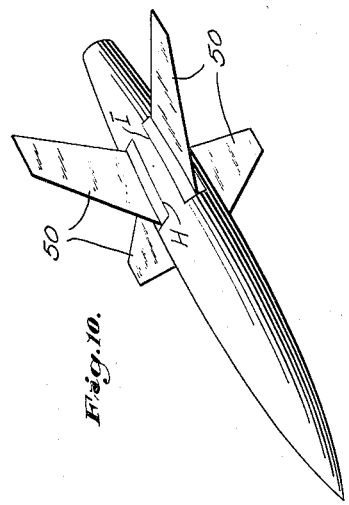
Fig. 10 is a perspective view of a supersonic missile indicating another form which this invention may take.

The supersonic vehicle to be controlled may not necessarily be of a configuration indicated in Figs. 5 and 6 but instead may assume the shape shown in Fig. 10 wherein four fixed control surfaces 50 may be used. In this modification a plurality of extensible control members H, I, J, K, L, M, N and O may be used as shown in Fig. 11. With this configuration, turn or directional control would be produced by projecting in pairs either the members O and L or H and K. In order to roll the vehicle counterclockwise and assuming that the high pressure region is utilized for control, the members H, N, L and J would be extended while on the other hand for clockwise roll the members O, M, K and I would be extended. Obviously, the pitching or horizontal control would be effected by projecting in pairs either the members N and I or M and J.

Figure 12:
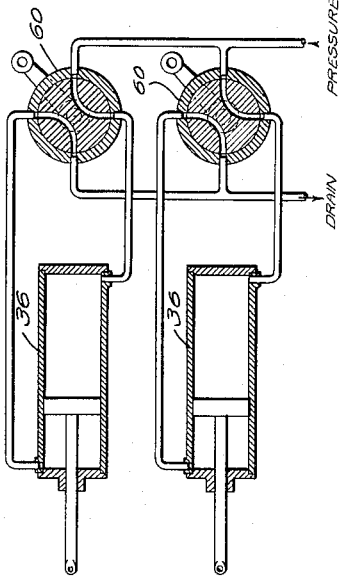
Fig. 12 is a partial schematic diagram of the hydraulic system for operating the projectable control members.

The extensible members A, B, C and D as shown in Figs. 5 and 6 may be controlled by means of two-way valves 60 (only two of which are shown in Fig. 12 for convenience) which can direct fluid under pressure to the unit actuating cylinders 36 or can direct fluid from the cylinders to a return. Similar mechanism well known in the art may be used in controlling the extensible members H, I, J, K, L, M, N and O of the configuration shown in Fig. 11.

The function of the movable flap type control member above described could also be fulfilled by the arrangements shown in Figs. 13, 14 and 15.

Referring to Fig. 13, the shock over the fixed surface 70 may be produced by an extensible unit 72 carried by the fuselage 74. The unit 72 consists of a pair of movable flap type surfaces 76 and 78 which are connected to the piston-cylinder combination 80 by means of a common pivot 82. The forward flap surface 76 is fixedly pivoted at its forward end to the fuselage at 84 while the aft end of the flap surface 78 is substantially free, being biased to a constantly engaged position with the fuselage at 86 by a spring loaded roller 88. Thus upon extension to the unit 72 the profile of the flap portion which is exposed to the airstream will provide a configuration similar to that diagrammatically illustrated in Fig. 7.

Fig. 14 represents another modified form of extensible control member wherein a rubber diaphragm 90 which is attached to the fuselage 74 replaces the flap type surfaces described above and can be controlled by admitting air under pressure to the chamber 92 to expand the diaphragm from the dotted to the full line position shown. The air pressure may be controlled by a valve similar to that shown in Fig. 12 to selectively produce a shock wave over the fixed surface or wing 70.

Still another method for producing the controlling shock wave over the fixed surface 70 is illustrated in Fig. 15 wherein a series of perforations or jets 96 are provided within the sides of the fuselage 74. Upon admission of air under pressure into the chamber 98, the stream of air passing through the jets 96 acts on the supersonic airstream to produce much the same effect as that provided by the flap type controls. In this case, as the air under pressure is emitted from the jets 96 the supersonic airstream will be deflected and the shock pattern created.

It should be noted that the invention described hereinbefore is in no way related to conventional spoilers or the like which are well known in the art and have previously been employed in connection with the subsonic speeds to either create drag or destroy lift over airfoils. The subsonic spoiler provides a disturbance primarily downstream, whereas the present invention provides a disturbance laterally as well, taking advantage of the characteristics of supersonic flow.

As a result of this invention a novel and simple control system has been provided for supersonic vehicles wherein the problems arising from conventional flap type controls or unitary, completely movable controls has been eliminated.

Further as a result of this invention a control system has been provided for supersonic vehicles which provides a relatively large control force with relatively small movable control members whose simplicity is readily adaptable to missiles of various types where structural weight is primarily important and space is at a premium.

It is apparent that various modifications and changes may be made in the arrangement and shape of the various parts shown and described herein without materially departing from the scope of this invention.

What is claimed by Letters Patent is:

1. In a vehicle comprising a fuselage, fixed wings extending laterally on both sides from said fuselage and longitudinally spaced from the center of gravity of said vehicle, said wings including upper and lower surfaces, movable members carried by said fuselage adjacent said upper and lower surfaces and selectively extensible therefrom in paired combinations for controlling said vehicle including aerodynamic means responsive to movement of said members for producing aerodynamic wave patterns extending adjacent to and across said surfaces whereby differences in pressure are created between the opposite sides of said surfaces.

2. In a supersonic aircraft, a fuselage, a plurality of surfaces of substantially symmetrical airfoil shape fixed to said fuselage, said surfaces being longitudinally spaced from the center of gravity of said aircraft, means for controlling said aircraft in flight including a resilient member adjacent each of said surfaces and expansible into the free airstream for producing shock waves over said surface, a source of fluid under pressure, a chamber having one of its walls formed by said resilient member, and means for selectively directing said fluid to and from said chamber.

3. In a supersonic aircraft, a fuselage, a plurality of airfoils fixed relative to said fuselage including top and bottom surfaces, said airfoils being longitudinally spaced from the center of gravity of said aircraft, means for selectively creating supersonic aerodynamic wave patterns over a major portion of said airfoils whereby differences in pressure result between the top and bottom surfaces of said airfoils to control said aircraft in flight including a member extensible from the aircraft into the airstream and located adjacent each of said airfoils, said member comprising a pair of toggle links having a common connection breakable toward and movable into the free airstream, means for pivotally supporting the end of one of said links on said fuselage, means for biasing the free end of the other of said links in juxtaposition with said fuselage in all positions of said toggle, and means for selectively moving said common connection into and out of said airstream.

4. In an aircraft, a fuselage, a plurality of members fixed relative to said fuselage each including two major surfaces, said members beig spaced longitudinally of said fuselage from the center of gravity of said aircraft, means for selectively creating supersonic aerodynamic wave patterns over a major portion of said members whereby differences in pressure result between the two major surfaces of said members to control the aircraft in flight including mechanism extensible from the aircraft into the airstream and located adjacent each of said members and means for selectively extending certain of said mechanisms.

5. In an aircraft adapted to fly at supersonic speeds, a fuselage, at least one member fixed to said fuselage and extending laterally therefrom and including two major surfaces, and at least one element carried by said fuselage and located adjacent the junction of the fuselage and substantially aligned with said member along the longitudinal axis of said fuselage, said element extending from adjacent the leading edge of said member substantially to and adjacent the trailing edge of said member, and means for selectively operating said element for creating shock waves extending therefrom across at least one of said major surfaces and increasing the pressure over a major portion thereof.

6. In a method of controlling an aircraft in a relatively supersonic airstream, said aircraft having a fuselage and a substantially flat member fixedly attached to and extending from the fuselage edgewise to the airstream, the step comprising, selectively creating shock waves and high pressure areas independently of said flat member and which areas extend over a substantial chordwise portion of the major sides of said member.

7. In a method of controlling an aircraft in a relatively supersonic airstream, said aircraft having a fuselage and a plurality of substantially flat members extending from the fuselage edgewise to the airstream, the step comprising, selectively creating independently of said flat members a shock wave and high pressure area which extends over a substantial chordwise portion of one of the major sides of each of said members.

References Cited in the file of this patent

UNITED STATES PATENTS

| | | |
|---|---|---|
| 1,879,187 | Goddard | Sept. 27, 1932 |
| 2,271,226 | Johnson | Jan. 27, 1942 |
| 2,400,388 | Campbell | May 14, 1946 |
| 2,428,936 | Hunter | Oct. 14, 1947 |
| 2,450,709 | Beman | Oct. 5, 1948 |
| 2,466,426 | Hoover | Apr. 5, 1949 |
| 2,549,020 | Seldon | Apr. 17, 1951 |